United States Patent
Sakuragi et al.

[15] 3,681,414
[45] Aug. 1, 1972

[54] METHOD FOR HALOGENATION OF UNSATURATED COMPOUNDS

[72] Inventors: Taketami Sakuragi, Tokyo; Shinichi Akiyama, Kamakura-shi, both of Japan

[73] Assignee: The Japanese Geon Co., Ltd., Tokyo, Japan

[22] Filed: Oct. 29, 1970

[21] Appl. No.: 85,275

Related U.S. Application Data

[63] Continuation of Ser. No. 694,383, Dec. 29, 1967, abandoned.

[30] Foreign Application Priority Data

Jan. 17, 1967 Japan..........................42/2898

[52] U.S. Cl............260/408, 260/465.7, 260/439 R, 260/648 R, 260/694
[51] Int. Cl...............................................C11c 3/00
[58] Field of Search ...260/408, 465.7, 539 R, 648 R, 260/694

[56] References Cited

UNITED STATES PATENTS 2,818,448  12/1957  O'Connell et al.............260/663
2,812,341  11/1957  Fareri et al. ..................260/408
2,557,159  6/1951   Teeter et al...................260/408
2,547,139  4/1951   Randall.........................260/654

OTHER PUBLICATIONS

Markley " Fatty Acids" Pg. 334, Interscience Publishers, Inc. N.Y. (1947).
Roncero et al. " Halogenation and Dehalogenation of Cotton Seed Oil," Chem. Abst. Vol. 52 (1958) 15926e.
Ogama et al. " Substitutive Chlorination of Olefins" Chem. Abst. Vol. 62 (1965) 10325h.

*Primary Examiner*—Lewis Gotts
*Assistant Examiner*—Catherine L. Mills
*Attorney*—Waters, Roditi, Schwartz and Nissen

[57] ABSTRACT

A method for the halogenation of unsaturated compounds, characterized in that at least one hydrogenhalide is reacted in the presence of an alkyl hypohalite at a temperature of −40°C. to 120°C. with a compound having a carbon-carbon unsaturated double bond to effect addition of halogen to the unsaturated double bond. The products obtained by the above-mentioned method are useful as industrial materials or intermediates.

10 Claims, No Drawings

METHOD FOR HALOGENATION OF UNSATURATED COMPOUNDS

This application is a continuation of Ser. No. 694383, filed Dec. 29, 1967, now abandoned.

This invention relates to a method for halogenating unsaturated portions of compounds having unsaturated bonds.

More particularly, the invention pertains to a process in which a hydrogen halide is reacted in the presence of an alkyl hypohalite with a compound having a carbon-carbon unsaturated double bond (hereinafter simply referred to as "unsaturated double bond") thereby selectively adding two halogen atoms to the unsaturated bond. Ordinarily, for the addition of halogen atoms to unsaturated bonds, it is most convenient and common to adopt processes in which halogen molecules or hydrogen halides are contacted directly with compounds having unsaturated bonds. However, according to the former process using halogen molecules, there are some cases where not only the addition to unsaturated bonds but also the substitution reaction to allyl position are brought about. Thus the prior art process makes the selective addition of halogen atoms to only unsaturated bonds difficult. In addition, in accordance with the above process, it is impossible to add two different halogen atoms to an unsaturated bond. On the other hand, according to the latter process using hydrogen halides, the number of halogen atom capable of being added to one unsaturated bond is one, and it is impossible to add two halogen atoms at a same time.

In accordance with the present invention, there is provided a method in which at least one hydrogen halide is reacted in the presence of an alkyl hypohalite with a compound having a carbon-carbon unsaturated double bond. This reaction is ordinarily effected in an organic solvent under mild conditions.

According to the present method, two halogen atoms can be added to an unsaturated bond under mild conditions, and when a hydrogen halide having a halogen atom different from that of alkyl hypohalite is reacted, two different halogen atoms can be added simultaneously.

When a hydrogen halide is represented by HX, where X is a halogen atom, and an alkyl hypohalite is represented by ROY, where R is a $C_1$–$C_a$ alkyl group or halogen-substituted alkyl group and Y is a halogen atom which may be same as or different from said X, the present method may be illustrated by way of the reaction equation

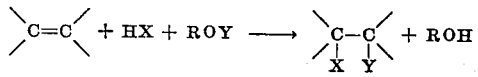

The compounds having unsaturated bonds which are used in the present invention include unsaturated hydrocarbons such as ethylene, propylene, butene-1, butene-2, isobutylene, hexene-1, butadiene, isoprene, cyclohexene and styrene; vinyl esters such as vinyl acetate, vinyl propionate and vinyl benzoate; vinyl ethers such as methyl vinyl ether and ethyl vinyl ether; unsaturated nitriles such as acrylonitrile and methacrylonitrile; unsaturated acids such as acrylic, methacrylic, crotonic, itaconic, malonic, oleic and linoleic acids, and esters thereof; readily obtainable low molecular weight compounds such as naturally occurring glyceride oil and the like; a wide variety of high molecular weight substances having unsaturated bonds in the molecules such as natural rubber, polyisoprene, polybutadiene, butadienestyrene copolymer, butadiene-acrylonitrile copolymer, isobutylene-isoprene copolymer, ethylene-propylene-diene copolymer and polychloroprene; and high molecular weight substances having unsaturated bonds in the molecules though the amounts thereof are small, such as polyolefins, e.g., polybutene.

Thus, according to the present method, the kinds and molecular weights of starting compounds having unsaturated bonds and the kinds and amounts of halogen atoms to be introduced can be varied widely, and therefore the resulting reaction products can be optionally varied over a wide scope of from liquid substances to elastomeric or resinous substances.

It may also be raised as one of the characteristics of the present invention that when the above reactions have been partly effected and unsaturated bonds are left in the reaction products, the steric structure of double bonds left in the reaction products is substantially identical with that of the unsaturated bonds in the starting unsaturated compounds or high molecular weight substances; in other words, cis-trans rearrangement reaction and the like of the remaining unsaturated bonds are not substantially accompanied.

As is clear from the aforesaid reaction equation, it is possible to use, in practicing the present method, all of hydrogen halides such as, for example, hydrogen chloride, hydrogen fluoride, hydrogen bromide and hydrogen iodide. These hydrogen halides may be used in the form of gases or of solutions in organic solvents. Alternatively, they may be used in the form of aqueous solutions since the presence of small amount of water in the system does not interfere the reaction of the invention.

In the practice of the present method, various alkyl hypohalites are usable. It is, however, preferable to use tertiary alkyl hypohalites, such as tertiary butyl hypohalites or tertiary amyl hypohalites, which are more stable than normal or secondary alkyl hypohalites. For example, tertiary butyl hypochlorite can be prepared with ease and at low cost and hence is particularly desirable.

In practicing the present method, alkyl hypohalite is desirably used in excess of hydrogen halide. However, even if the amount of alkyl hypohalite is less than the amount of hydrogen halide, the desired reaction progresses, though the yield is reduced. Therefore, the amount of alkyl hypohalite does not become an important factor. Further, the reaction proceeds mildly unless the reaction temperature is particularly high, and therefore the order and rate of addition of hydrogen halide or alkyl hypohalite neither become important factors. Generally, however, it is desirable to adopt such order that a hydrogen halide is previously incorporated into a reaction medium containing a compound having unsaturated bond and then the mixture is gradually charged with an alkyl hypohalite or a solution containing the same, or such order that an alkyl hypohalite is previously incorporated into a reaction medium containing a compound having unsaturated bond and then the mixture is gradually charged with a hydrogen halide or a solution containing the same.

Solvents usable in the present method may be any of those which are not reactive with the alkyl hypohalites and hydrogen halides employed in the present invention and which can dissolve the starting unsaturated compounds. Such solvents include, for example, aliphatic solvents such as heptane, hexane and cyclohexane; aromatic solvents such as benzene, nitrobenzene, halogenated benzene, toluene and xylene; ether type solvents such as diethyl ether and dioxane; ester type solvents such as ethyl acetate; ketone type solvents such as methylethylketone and cyclohexanone; chlorinated hydrocarbon solvents such as ethyl chloride, chloroform and carbon tetrachloride; tertiary alcohols such as tertiary butyl alcohol; and carbon disulfide. Generally, these may be used either singly or in admixture depending on the kinds and molecular weights of the starting compounds having unsaturated bonds. Since the solvents employed herein do not take part in the reaction, the reaction can be proceeded in the absence of solvent in the cases where the reagents can be thoroughly contacted and mixed with the compound to be treated.

In the present invention, the reaction temperature is not a critical factor dominating the reaction of the invention, and hence is variable over a wide range, e.g. from −40°C. to 120°C. or more. Ordinarily, the reaction is effected at a temperature within the range of from −20°C. to 80°C. The reaction progresses slowly at low temperatures and is accelerated with increasing temperature, like in the case of general chemical reactions. The reaction terminates in several minutes to several hours, in general, but no injury is observed even when the reaction is continued for a longer period of time.

The reaction product can be separated according to an ordinary procedure. After the reaction, the alkyl hypohalite used in the reaction is present as a corresponding alcohol, e.g., tertiary butyl alcohol in the case of tertiary butyl hypochlorite, and therefore it may be recovered and recycled as hypohalite, if necessary.

The thus produced compounds can become useful industrial materials or intermediates therefore, according to their properties, as intermediates for medicines or agricultural chemicals, as blending agents or processing assistants for elastomers or resins, adhesives, paints or elastomer bases.

The present invention is concretely illustrated below with reference to examples.

EXAMPLE 1

Three hundred ml. of a benzene solution containing 11 g. of cis-1,4-polybutadiene having a mooney value of 42.5 ($ML_{1+4}100°C.$) was mixed with a solution of 4 g. of a 35% aqueous hydrogen chloride solution (HCl: 0.04 mol.) in 50 ml. of tertiary butyl alcohol. To this mixed solution was gradually added a solution of 5.4 g. (0.05 mol.) of tertiary butyl hypochlorite.

After stirring at room temperature for 3 hours, the reaction mixture was charged in a large amount of methanol, and the reaction product was separated to obtain a rubbery substance. According to elementary analysis, the reaction product contained 18.7 percent by weight of chlorine. When this result is compared with the calculated value (chlorine: 19.8 percent by weight) obtained by assuming that 100 percent of the added hydrogen chloride has reacted according to the aforesaid reaction equation with the double bond of the starting cis-1,4-polybutadiene, it is understood that the added hydrogen chloride reacted at a conversion of about 95 percent with the double bond of the starting cis-1,4-polybutadiene in the presence of tertiary butyl hypochlorite. This is more clear from the fact that according to elementary analysis, no substantial chlorine is contained in products obtained by individually contacting, under the same conditions as in this example, 4 g. of a 35 percent aqueous hydrogen chloride solution and 5.4 g. of tertiary butyl hypochlorite with 11 g. of the starting cis-1,4-polybutadiene.

EXAMPLE 2

The same operations as in Example 1 were effected except that the cis-1,4-polybutadiene was replaced by 14.4 g. of a butadiene-styrene copolymer having a mooney value of 67.2. The resulting rubbery reaction product was subjected to elementary analysis to confirm that it contained 16.3 percent by weight of chlorine.

EXAMPLE 3

The same operations as in Example 1 were effected except that the 3% aqueous hydrogen chloride solution was replaced by 1.7 g. of a 46 percent aqueous hydrogen fluoride solution (HF: 0.04).

The resulting rubbery reaction product was insoluble in ordinary rubber solvent, and it was confirmed as the result of elementary analysis that it contained 5.3 percent by weight of fluorine and 10.0 percent by weight of chlorine.

It was further confirmed from the results of elementary analysis and infrared spectrography that the reaction product was substantially indentical in structure with a product obtained by reacting hydrogen chloride using as an assistant an alkyl hypofluorite, e.g. trifluoromethyl hypofluorite.

EXAMPLE 4

The same operations as in Example 3 were effected except that the cis-1,4-polybutadiene was replaced by 14.4 g. of a butadiene-styrene copolymer having a mooney value of 67.2. The resulting rubbery reaction product was insoluble in ordinary rubber solvents, and it was confirmed as the result of elementary analysis that it contained 4.3 percent by weight of fluorine and 8.4 percent by weight of chlorine.

EXAMPLE 5

The same operations as in Example 1 were effected except that the 35 percent aqueous hydrogen chloride solution was replaced by 6.9 g. of a 47 percent aqueous hydrogen bromide solution (HBr: 0.04 mol.).

The resulting rubbery reaction product was subjected to elementary analysis to confirm that it contained 15.3 percent by weight of bromine and 7.2 percent by weight of chlorine. It was further confirmed from the results of elementary analysis and infrared spectrography that the reaction product was substantially identical in structure with a reaction product obtained by reacting hydrogen chloride in the presence of tertiary butyl hypobromite.

EXAMPLE 6

Hydrogen chloride gas was injected at room temperature for 1 hour at a rate of 60 ml. per minute into 500 ml. of a benzene solution containing 59.2 g. (0.2 mol.) of methyl oleate and 32.6 g. (0.3 mol.) of tertiary butyl hypochlorite. After stirring at room temperature for 3 hours, the reaction mixture was thoroughly washed several times with large amounts of a 1 percent sodium carbonate solution and water, and was then heated over a water bath at 80°C. to distill off unreacted tertiary butyl hypochlorite, benzene and water, whereby about 65 g. of a yellow oily reaction product was obtained.

This reaction product was subjected to elementary analysis to confirm that it contained about 17 percent by weight of chlorine.

EXAMPLE 7

Hydrogen chloride gas was injected at room temperature for 1.5 hours at a rate of 60 ml. per minute into 500 ml. of a tertiary butyl alcohol solution containing 41 g. (0.5 mol.) of cyclohexene and 65 g. (0.6 mol.) of tertiary butyl hypochlorite. After stirring at room temperature for 3 hours, the reaction mixture was charged into a large amount of a 1 percent aqueous sodium carbonate solution, whereby a mixture comprising reaction product, unreacted cyclohexene, unreacted tertiary butyl hypochloride was separated in the form of oil. The oily mixture was thoroughly washed with water and was then heated over a water both at about 90°C. to distill off unreacted tertiary butyl hypochlorite and cyclohexene, whereby about 63 g. of a liquid reaction product was obtained.

This reaction product was subjected to elementary analysis to confirm that it contained about 40 percent by weight of chlorine.

EXAMPLE 8

To 500 ml. of a tertiary butyl alcohol solution containing 41 g. (0.5 mol.) of cyclohexene and 22 g. (0.5 mol.) of a 46 percent aqueous hydrogen fluoride solution was gradually added a solution of 65 g. (0.6 mol.) of tertiary butyl hypochlorite in 100 ml. of tertiary butyl alcohol. After stirring the mixture at room temperature for 3 hours, substantially the same treatments as in Example 7 were effected to obtain about 50 g. of a liquid reaction product.

This reaction product was subjected to elementary analysis to confirm that it contained 13 percent by weight of fluorine and 29 percent by weight of chlorine.

EXAMPLE 9

The same operations as in Example 1 were effected except that the 35 percent aqueous hydrogen chloride solution was replaced by 9.3 g. (0.04 mol.) of a 55 percent aqueous hydrogen iodide solution.

The resulting rubbery reaction product was subjected to elementary analysis to confirm that it contained 27.7 percent by weight of iodine and 8.0 percent by weight of chlorine.

EXAMPLE 10

The same operations as in Example 1 were effected except that the benzene solution containing tertiary butyl hypochlorite was replaced by a benzene solution containing about 10 g. (0.05 mol.) of tertiary butyl hypoiodite. The resulting rubbery reaction product was subjected to elementary analysis to confirm that it contained 28.3 percent of iodine and 7.6 percent by weight of chlorine. It was further confirmed from the results of infrared spectrography that the reaction product was substantially identical in structure with the reaction product of Example 9.

We claim:

1. A method for the halogenation of unsaturated compounds, said method comprising reacting at least one hydrogen halide in the presence of an alkyl hypohalite having one to eight carbon atoms at a temperature of −40°C. to 120°C. with a compound having a carbon-carbon unsaturated double bond to fully halogenate the unsaturated double bond with the halogen atoms, a first of said halogen atoms being derived from the hydrogen halide and the second of said halogen atoms being derived from the alkyl hypohalite.

2. A method as claimed in claim 1 wherein the alkyl hypohalite is a tertiary alkyl hypohalite.

3. A method as claimed in claim 2 wherein the tertiary alkyl hypohalite is a tertiary butyl hypohalite.

4. A method as claimed in claim 3 wherein the tertiary butyl hypohalite is tertiary butyl hypochlorite.

5. A method as claimed in claim 2 wherein the tertiary alkyl hypohalite is a tertiary amyl hypohalite.

6. A method as claimed in claim 1 wherein the halogen of the alkyl hypohalite is different from the halogen of the hydrogen halide.

7. A method as claimed in claim 1 wherein reacting is effected in the presence of one or more organic solvents inert to the hydrogen halide and the alkyl hypohalite.

8. A method as claimed in claim 1 wherein the alkyl hypohalite is present in a molar excess with respect to the hydrogen halide.

9. A method as claimed in claim 1 wherein reacting is effected at a temperature of −20°C. to 80°C.

10. A method as claimed in claim 1 wherein the hydrogen halide is reacted in gaseous form, in the form of a solution in an organic solvent or in the form of an aqueous solution.

* * * * *